United States Patent

Sinden

[11] Patent Number: 5,889,889
[45] Date of Patent: Mar. 30, 1999

[54] METHOD AND APPARATUS FOR MACHINE RECOGNITION OF HANDWRITTEN SYMBOLS FROM STROKE-PARAMETER DATA

[75] Inventor: Frank William Sinden, Princeton, N.J.

[73] Assignee: Lucent Technologies Inc., Murray Hill, N.J.

[21] Appl. No.: 766,285

[22] Filed: Dec. 13, 1996

[51] Int. Cl.[6] .............................. G06K 9/00; G06K 9/46; G06K 9/66; G06K 9/62

[52] U.S. Cl. ......................... 382/187; 382/186; 382/191; 382/198; 382/201; 382/218; 382/225

[58] Field of Search ...................... 382/188, 182, 382/185, 186, 187, 190, 191, 197, 198, 200, 201, 216, 218, 224, 225–229; 345/173

[56] References Cited

U.S. PATENT DOCUMENTS

| | | | |
|---|---|---|---|
| 4,550,438 | 10/1985 | Convis et al. .............................. | 382/56 |
| 4,653,107 | 3/1987 | Shojima et al. ......................... | 382/197 |
| 4,718,103 | 1/1988 | Shojima et al. ......................... | 382/197 |
| 5,293,429 | 3/1994 | Pizano et al. ............................ | 382/202 |
| 5,315,667 | 5/1994 | Fujisaki et al. .......................... | 382/311 |
| 5,321,770 | 6/1994 | Huttenlocher et al. .................. | 382/174 |
| 5,544,261 | 8/1996 | Bellegarda et al. ..................... | 382/187 |
| 5,559,897 | 9/1996 | Brown et al. ............................ | 382/186 |
| 5,577,135 | 11/1996 | Grajski et al. ........................... | 382/253 |
| 5,742,705 | 4/1998 | Parthsarathy ............................ | 382/187 |

*Primary Examiner*—Bipin Shalwala

[57] ABSTRACT

A method is described for the automatic recognition of at least one handwritten symbol. A representation of such symbol is provided, in a data storage medium, as a sequence of one or more discrete strokes having respective initial and final endpoints, a spatial location and a tangent angle being associated with each endpoint. Representations of plural library symbols, each a prototype of a possible class to which the input symbol may be assigned, are retrieved from a data storage medium. A comparison between the input-symbol representation and each of the retrieved library symbol representations includes comparing the respective tangent angles of the input symbol with the corresponding tangent angles of at least some of the library symbols, and comparing the respective endpoint locations of the input symbol with the corresponding endpoint locations of at least some of the library symbols.

26 Claims, 9 Drawing Sheets

UNKNOWN SYMBOL   ALPHABET 'F'   ALPHABET 'K'

SUPERIMPOSED SO CENTROIDS OF ENDPOINTS COINCIDE

SCORE = .073   SCORE = .123

AFTER OPTIMAL LINEAR TRANSFORMATION

SCORE = .064   SCORE = .025

FIG. 12

ABCDEFGHIJKLMNOPQ
RSTUVWXYZ123456789
G J YZ a4
U Z

METHOD AND APPARATUS FOR MACHINE RECOGNITION OF HANDWRITTEN SYMBOLS FROM STROKE-PARAMETER DATA

FIELD OF THE INVENTION

This invention relates to the processing of human handwriting for purposes of information storage, automatic character recognition, and the like. More particularly, this invention relates to automatic recognition of handwritten symbols that are previously spatiotemporally sampled and represented in parametric form.

ART BACKGROUND

In one approach to machine reading of human handwriting, the automatic symbol recognizer initially accepts any collection of classified symbols of arbitrary shape entered by the user. Thereafter, the reliability of recognition depends only on the variability of the user's own renditions of a particular symbol. However, a public symbol recognizer, which is trained to recognize the characters of a standard alphabet used by a large population of potential users, will generally be more useful than a private symbol recognizer trained only to recognize the idiosyncratic alphabet of one or a few individuals.

A public symbol recognizer, on the other hand, must deal with variations in the renditions of symbols over a large user population. The range of such variations will generally be much greater than that for a single individual.

One approach to this problem is to train the symbol recognizer using an exhaustive collection of training patterns that represents the full range of variability expected in the user population. This approach suffers from the disadvantages that the initial training set may be extremely large, and advance knowledge is required of the variations that are to be expected.

A second approach is to restrict variability by training the users to adhere to a standard. The training process may be as simple as a requirement for the user to form characters according to a fixed set of instructions, or as extensive as a regimen of memorization and practice. This approach is likely to be unattractive because of the demands that it places upon the user.

A third approach is to make the symbol recognizer do the learning. That is, the symbol recognizer can be made to observe the symbols written by the user, and to adapt its stored class prototypes to agree with the user's personal style. For example, one form of adaptation involves morphing, i.e., a procedure for continuously transforming any curve into any other curve. Each time the symbol recognizer correctly identifies a symbol, it shifts the corresponding prototype fractionally toward the user's version of the symbol along the morph path.

Such an adaptive symbol recognizer gradually grows more reliable, but also more dependent upon the user who is training it. When a new user is introduced, the symbol recognizer must start over with the standard, public version of the alphabet.

Practical symbol recognizers have generally combined two, or even all three, of these approaches. Additionally, the matching of an input symbol to a class prototype can be performed using any of a great number of different algorithms. Such algorithms may rely, for example, upon a direct comparison of shapes, or they may rely upon comparisons in parameter spaces of low or high complexity. Unfortunately, it has not yet proven feasible to emulate the extreme complexity of the process that the human brain uses for character recognition, and it has not been possible to duplicate the extreme accuracy of human perception in recognizing highly variable characters. A successful symbol recognizer will generally embody a tradeoff among algorithm complexity, amount of human learning required, and amount of machine learning required.

Such a tradeoff can be particularly favorable in a symbol recognizer that performs comparisons in a parameter space of moderate size, to achieve a basic level of accuracy using a public alphabet. In particular, such a symbol recognizer could readily serve as the front end for a symbol recognizer that achieves high long-term accuracy by further including a facility for machine adaptation.

SUMMARY OF THE INVENTION

I have invented a symbol recognizer that performs comparisons in a parameter space of moderate size, to achieve at least a basic level of accuracy using a public alphabet.

My symbol recognizer receives, as input, stroke parameters that characterize the strokes (i.e., the curve segments) of handwritten symbols that have previously been spatiotemporally sampled and segmented. One exemplary method for segmenting handwritten symbols and representing them by parameter sets is described in my co-pending U.S. patent applications Ser. No. 08/729466, entitled "Method and Apparatus for Reconstructing Handwritten Symbols from Parametric Representations Thereof", and Ser. No. 08/729463, entitled "Method and Apparatus for Parametric Representation and Reconstruction of Handwritten Symbols", which are hereby incorporated by reference.

Briefly, this exemplary method for representing symbols involves a temporally sequenced record of data points obtained from an electronic tablet underlying the paper. For each data point the record includes the x and y coordinates of the pen and the time observation. (Typically, observations are taken every 5 milliseconds.) When the pen is off the paper, no data are recorded but the clock continues to run.

Segmentation is typically achieved by identifying natural breakpoints between strokes. Breakpoints are identified by such criteria as abruptness of direction changes, as well as by pen lifts.

To continue, the exemplary representational method involves recording, for each stroke, a so-called standard parameter set that comprises the x and y coordinates of the stroke's endpoints, the arc length s of the stroke, the angle $\phi_1$ of the stroke's tangent at the first endpoint, the angle $\phi_2$ of the stroke's tangent at the second endpoint, and the binary pen-up indicator f. These constitute the input to the symbol recognizer of the present invention.

When using this exemplary method of representation, I have found it advantageous, in the segmentation process, to keep track of pen-up trajectories as if they were strokes. Since the actual path of the pen in the air is unknown, I represent it by a straight line joining the point where the pen left the paper with the point where the pen returned to the paper. The parameter f distinguishes such artificial strokes from the ones that were actually drawn.

In a broad sense, the operation of my symbol recognizer involves providing, in a data storage medium, a representation of at least one handwritten symbol as a sequence of one or more discrete strokes having respective initial and final endpoints. This representation desirably comprises a spatial location and a tangent angle associated with each endpoint. The recognition operation further involves retrieving, from a data storage medium, representations of plural library symbols, each of which is a prototype of one of the possible classes to which the input symbol may be assigned. The operation further involves, in a digital data processor, comparing the input-symbol representation to each of the retrieved library symbol representations. The comparing step includes comparing the respective tangent angles of the input symbol with the corresponding tangent angles of at least some of the library symbols; and comparing the respective endpoint locations of the input symbol with the corresponding endpoint locations of at least some of the library symbols.

BRIEF DESCRIPTION OF THE DRAWINGS

FIG. 12 is an illustrative alphabet of alphanumeric symbols that human subjects may be instructed to emulate when creating handwritten input for processing by the invention in some embodiments.

DETAILED DESCRIPTION

Figure 1:
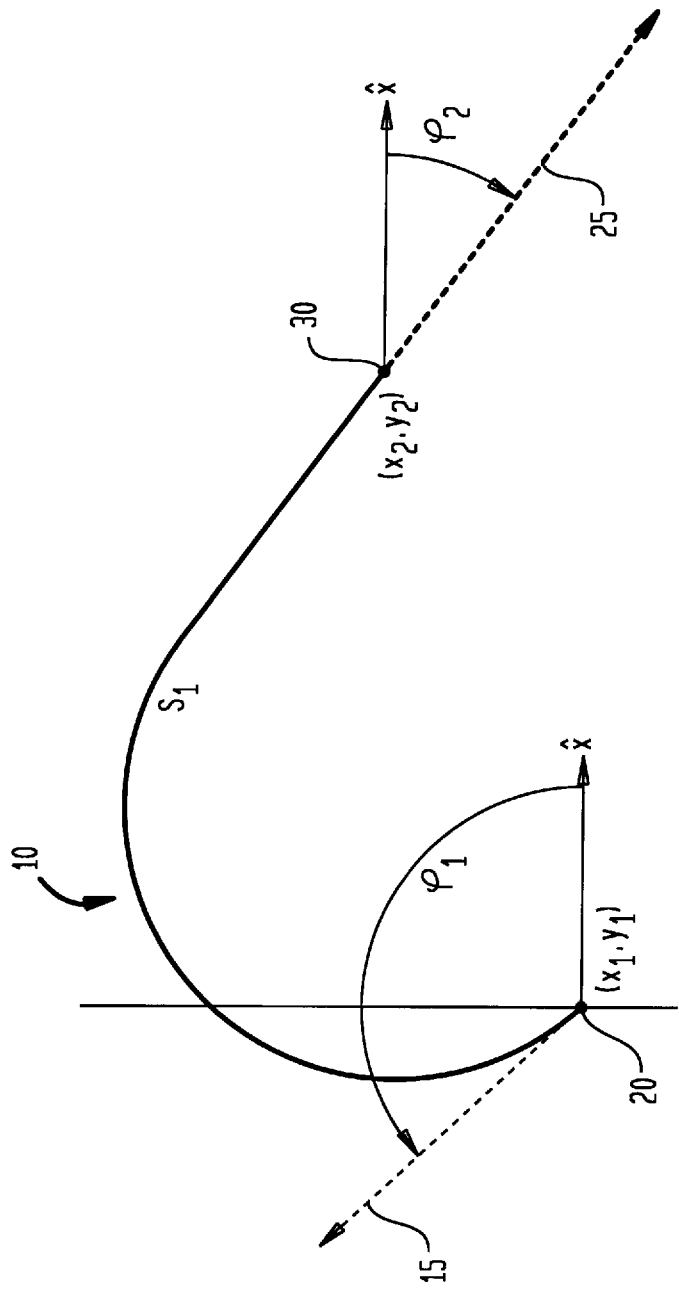
FIG. 1 depicts a single stroke isolated from a hypothetical handwritten symbol. Indicated on the figure are endpoint coordinates, endpoint tangent angles, and arc length, all of which are useful for representing the stroke parametrically.
Figure 2:
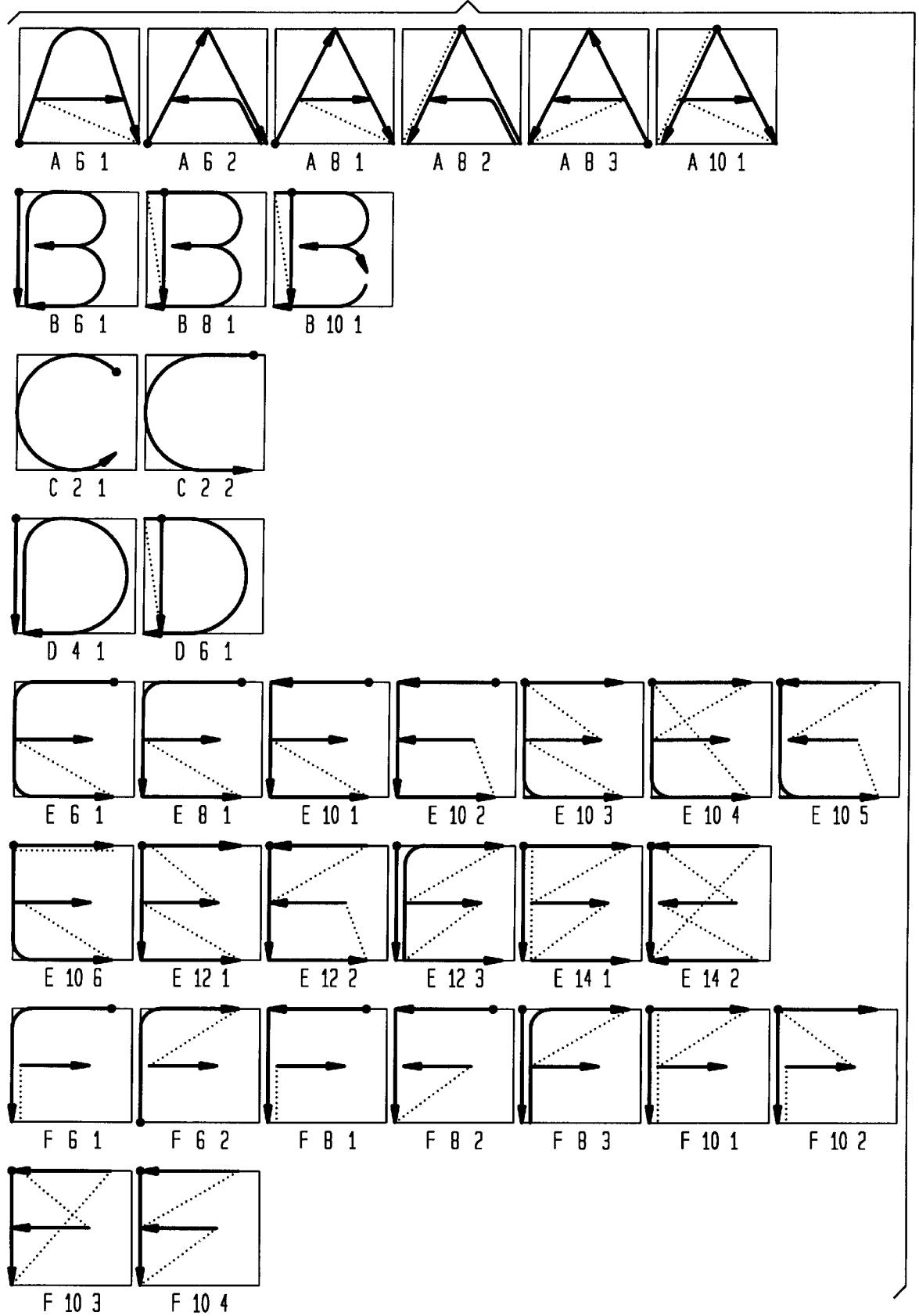
FIGS. 2–6 depict an exemplary stored alphabet of symbol prototypes to which input symbols are to be matched, according to the invention in some embodiments.
Figure 3:
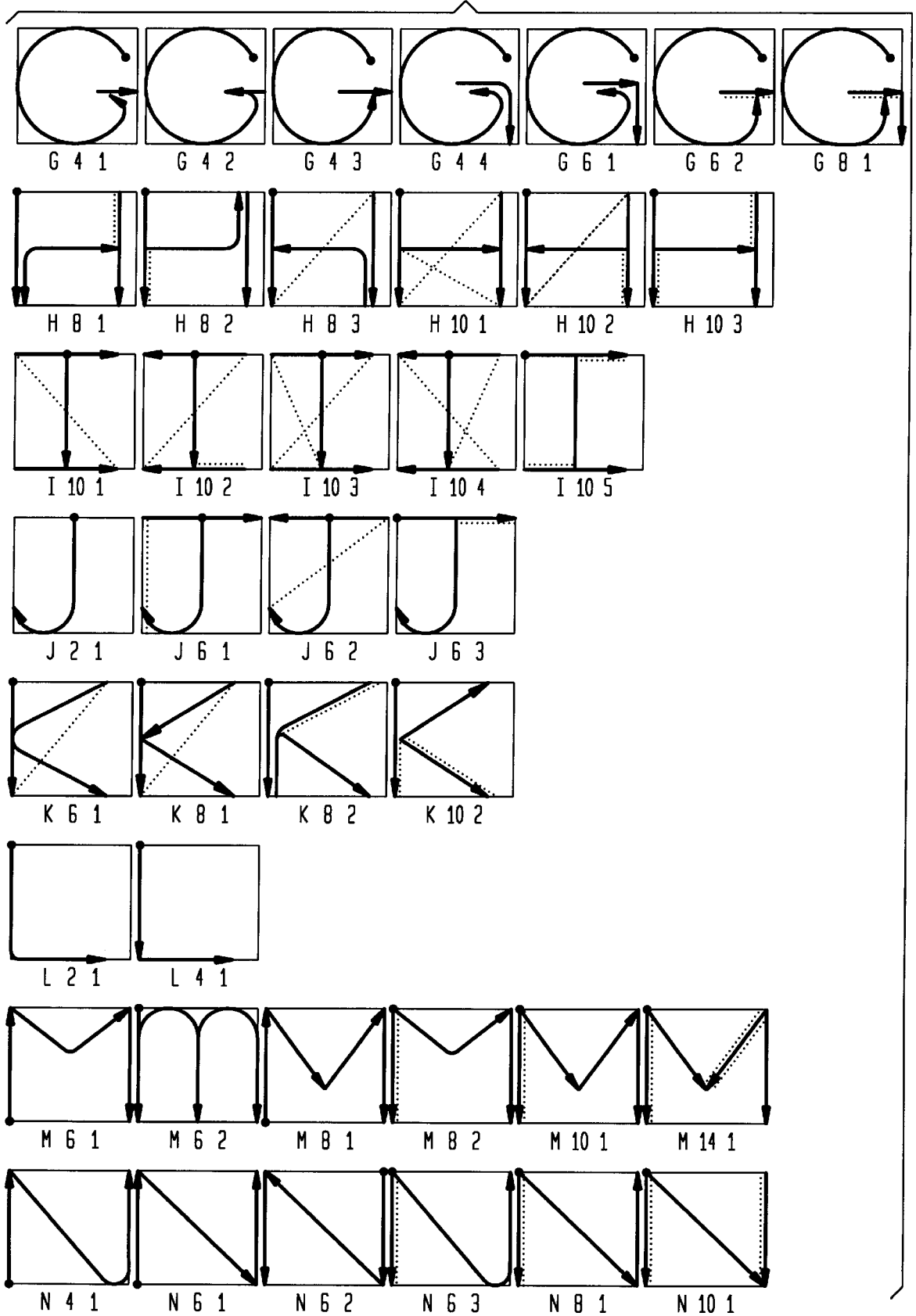
Figure 4:
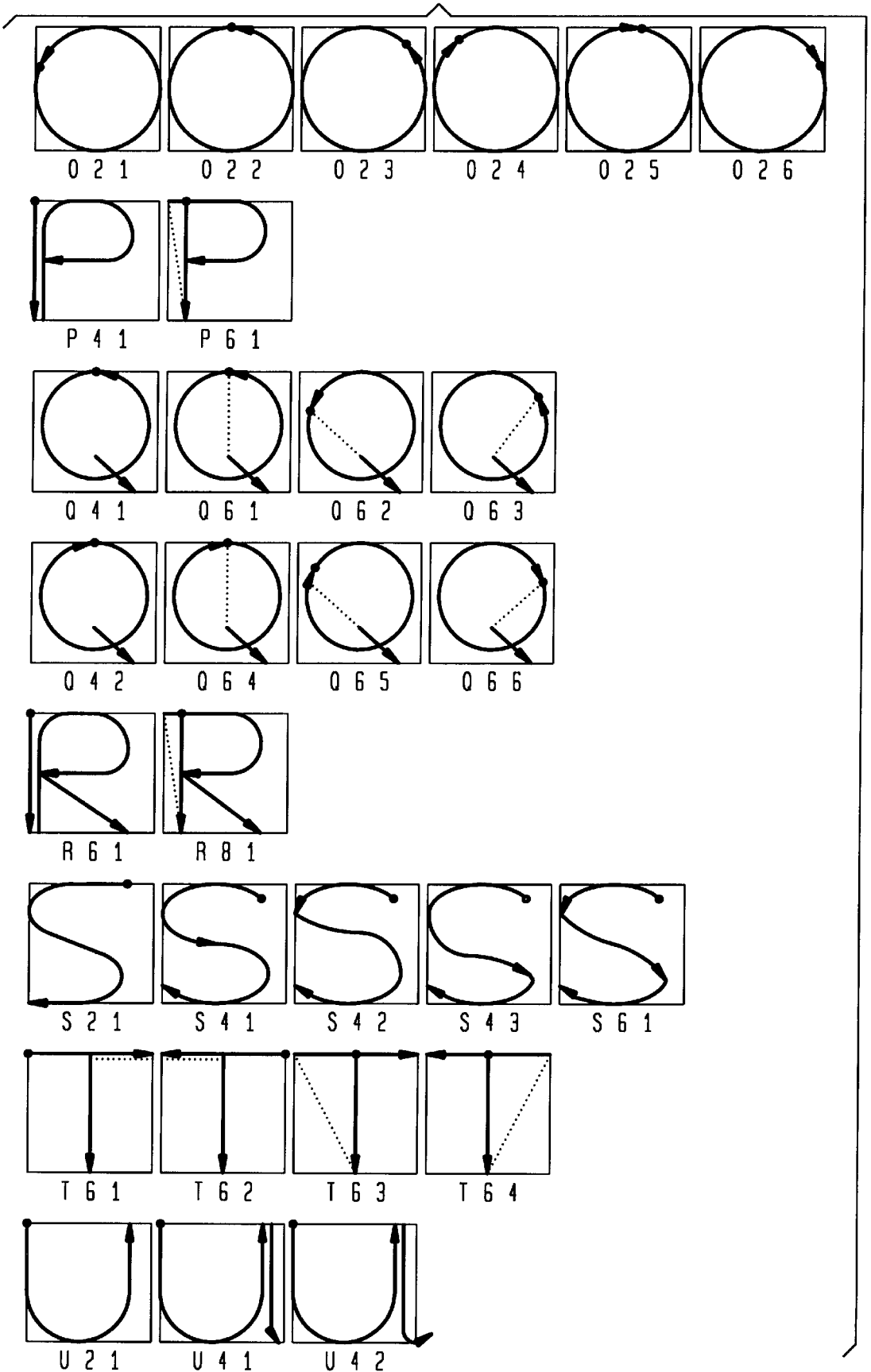
Figure 5:
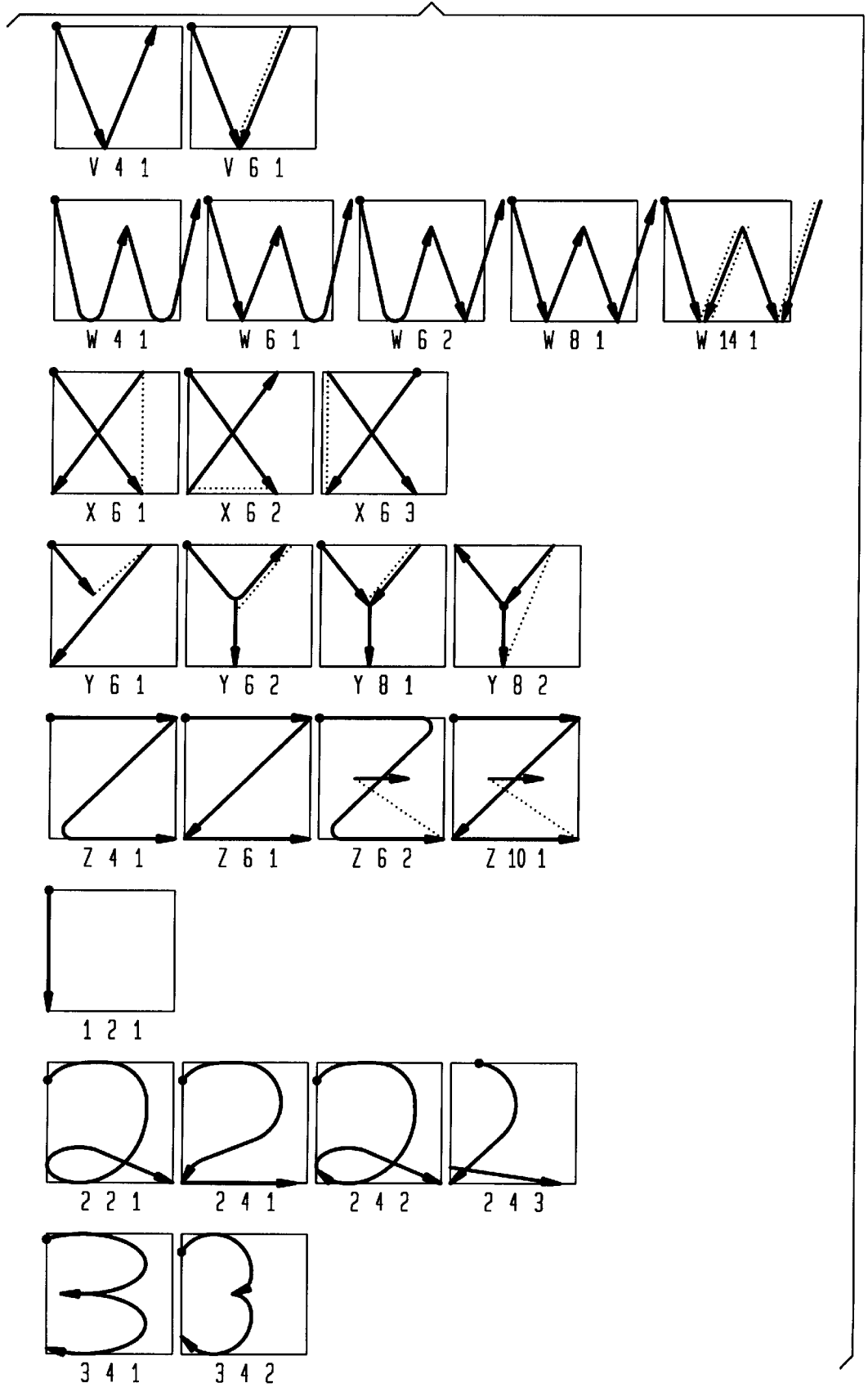
Figure 6:
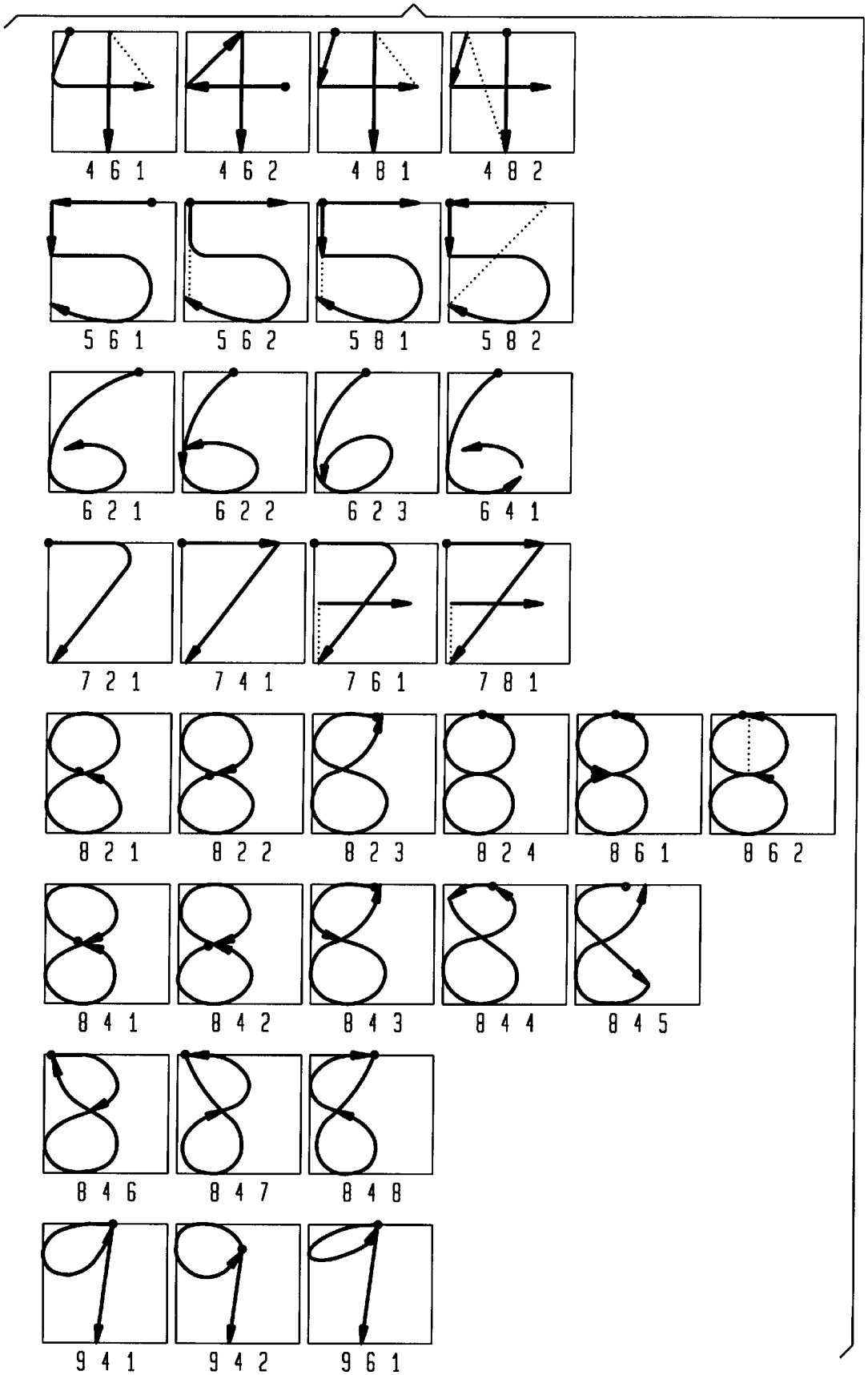

Depicted for purposes of illustration in FIG. 1 is one stroke 10 isolated from a hypothetical handwritten symbol. A directed tangent 15 is associated with initial endpoint 20 of the stroke, and a directed tangent 25 is associated with final endpoint 30 of the stroke. These tangents make respective angles $\phi_1$ and $\phi_2$ with the x-axis. The arc length of the stroke, from the initial to the final endpoint, is denoted s.

Given a sequence of $$\frac{m}{2}$$

strokes (m an even positive integer), the following is a convenient format for recording the corresponding stroke-parameter data:

| $s_1$ | $\phi_1$ | $x_1$ | $y_1$ |
| $s_2$ | $\phi_2$ | $x_2$ | $y_2$ |
| $s_3$ | $\phi_3$ | $x_3$ | $y_3$ |
| $s_4$ | $\phi_4$ | $x_4$ | $y_4$ |
| ... | ... | ... | ... |
| $s_m$ | $\phi_m$ | $x_m$ | $y_m$ |

Here, each line corresponds to an endpoint; thus, each pair of sequential lines corresponds to a stroke if the first line of the pair is odd-numbered, and each pair corresponds to a joint between strokes if the first line is even-numbered. Each of the angles $\phi_i$ is a tangent angle, relative to the x-axis. The arc length s and the pen-up indicator f each only need to be recorded once per stroke (i.e., once per pair of lines). Therefore, s and f are represented alternately in the column denoted $s_i$. That is, $s_i$ is the arc length if i is odd, and is the pen-up indicator if i is even.

My preferred segmentation procedure, which is described more fully in the above-cited patent applications, inserts breakpoints at corners and cusps, where direction changes abruptly. Moreover, as discussed below, it is significant that the stylus moves more slowly near the discontinuities than it does elsewhere, as evidenced by the fact that the sampled points lie closer together near the discontinuities.

A filter function is readily defined that assumes relatively high values at discontinuities and pen slowdowns, and still higher values when both of these features occur together. An adjustable threshold is readily applied to the output of this function for discriminating actual corners and cusps from background noise. The threshold level should be chosen carefully. If it is too low, natural strokes will be subdivided into an excessive number of smaller strokes. If it is too high, a pair of strokes separated by, e.g., a slightly rounded corner will be interpreted as a single stroke. In some cases, it may be advantageous to discriminate through the use of multiple threshold levels.

The results of the thresholded filter function are dependent upon curvature and pen speed. Therefore, these results will vary with changes in the temporal and spatial scales, unless an appropriate normalization procedure is used. For applications to discrete symbol recognizers, the natural unit for normalization is the complete symbol. Therefore, I currently prefer to normalize by scaling each symbol to a standard height (i.e., the height of the prototype alphabet symbols), and then scaling time so that the maximum pen speed is defined as having a standard value such as unit value.

Alphabet symbols (i.e., symbol prototypes) are represented by the same parameters as are the input symbols, and these parameters are stored in the same format. In storage, alphabet symbols are advantageously listed according to the number of strokes that they contain. That is, symbols having a single stroke are listed first, then those consisting of two strokes, then three, etc. Exemplarily, the largest number of strokes for any given character in my current alphanumeric alphabet is seven.

Many multi-stroke alphabet symbols can be (and in practice, are) written with several different stroke orders. This problem can be dealt with by:

(i) demanding that the user conform to a single prescribed stroke order; or (ii) representing each stroke order that occurs in practice as a distinct symbol; or (iii) ignoring stroke order and thus treating symbols as unordered sets of strokes.

The first solution is disadvantageous because of the demands that it places on the user. I currently prefer to adopt the second solution, and this solution is embodied in the invention as herein described. However, the third solution may also be advantageously employed in at least some cases. The third solution reduces the size of the alphabet required, but calls for criteria other than stroke order for evaluating matches between input symbols and alphabet symbols.

By way of example, my current alphabet contains 161 variants to represent the 35 Arabic numerals and Roman capital letters. (No distinction is made between "zero" and the letter "O".) Of these variants, 53 represent alternative stroke orders, and 73 are variants needed for reasons other than stroke order.

For illustrative purposes, my current alphabet is depicted in FIGS. 2–6. It should be noted that strokes represented in the figures by dotted lines are pen-up strokes.

My general approach to the recognition problem employs a hierarchical sequence of filtering steps. I begin with rapid screening using tests of relatively low complexity, and generally end with detailed tests that select between pairs of similar alphabet symbols.

Figure 7:
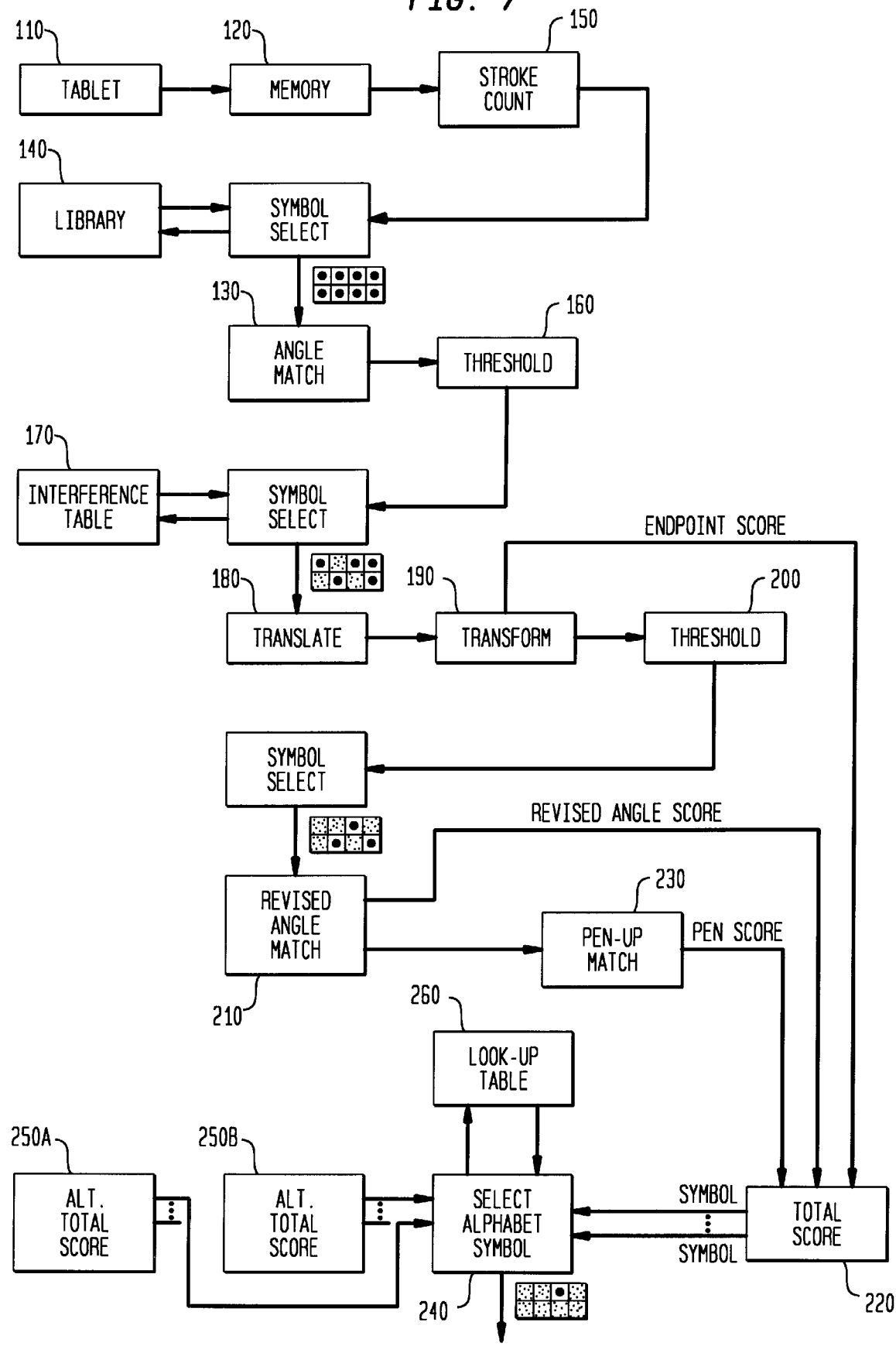
FIG. 7 is a schematic block diagram describing the operation of the invention for an illustrative embodiment.

An exemplary sequence of filtering steps is depicted in FIG. 7. At various places within the figure, the symbol ● is used, in a figurative sense, to represent a candidate alphabet symbol that survives to a given filtering level.

As shown in the figure, digitized input data from, e.g., instrumented tablet 110 are typically processed in a digital computer and stored in digital recording medium 120 in a representation that provides, for each handwritten symbol, a sequence of one or more discrete strokes, each of which is recorded parametrically.

In a first test 130, the tangent angles of the input symbol are compared with the tangent angles of at least certain alphabet symbols, and a score is assigned to each such comparison. The alphabet symbols are selected from library 140 of stored symbols, based on a measurement 150 of stroke count, as explained below. Alphabet symbols whose scores fall below a threshold, and thus pass test 160, survive as candidates for the next test. Tangent angles advantageously serve as a basis for such a test because they are independent of the relative location and scale of each symbol being compared.

A convenient formula for the score $S_\phi[i]$ for matching an input symbol having m endpoints (m an even integer) to an alphabet symbol of index i and having an endpoint count $m_A[i]$ which is equal to m is given by:

$$S_\phi[i] = \frac{1}{m} \sum_{j=1}^{m} (\phi[j] - \phi_A[i, j])^2. \quad (1)$$

Here, $\phi[j]$ denotes the tangent angle at the j-th endpoint of the input symbol, and $\phi_A[i,j]$ denotes the tangent angle at the j-th endpoint of the i-th alphabet symbol.

In a further comparison step, I compare the input symbol with those alphabet symbols having one stroke fewer than the unknown; i.e., for which $m_A[i]=m-2$. For purposes of each resulting comparison, I omit from the input symbol those two adjacent endpoints whose omission leads to the lowest score upon comparison with the instant candidate alphabet character. The corresponding formula can be represented by:

$$S_\phi[i] = \min_{k=0}^{m-2} \frac{1}{m-2} \left\{ \sum_{j=1}^{k} (\phi[j] - \phi_A[i, j])^2 + \quad (2) \right.$$

$$\left. \sum_{j=k+3}^{m} (\phi[j] - \phi_A[i, j-2])^2 \right\}.$$

This second step, in which, e.g., $\phi[k^*+1]$, $\phi[k^*+2]$ is the omitted pair that minimizes $S_\phi[i]$, can be helpful in dealing with several typographical ambiguities. For example, the omitted angles $\phi$ are at the endpoints of a stroke if $k^*+1$ is odd. This test may omit spurious upward strokes of the kind that often occur at the beginnings of handwritten symbols, as well as extraneous marks caused by delayed pen lifts, gratuitous flourishes, or noise. If $k^*+1$ is even, the omitted angles are from a joint. A spurious joint can occur, e.g., if the writer makes a curve, such as the bow of the letter P, too pointed.

However, the omission of a joint or stroke from a correct symbol, can produce a different correct symbol. (E.g., omitting the tail of a letter R yields the letter P.) Thus, a given input symbol might give a good match to one letter (such as R) in the test of Equation (1), and give a good match to a different letter (such as P) in the test of Equation (2).

One solution to this problem is to first perform this test using alphabet symbols having the greater number n of strokes, and then using those having n−1 strokes. An interference table 170 stores information regarding those pairs of symbols that can be interconverted by the omission of a joint or stroke. If the Equation (1) test admits, e.g., the letter R (i.e., the n-stroke member of the R-P pair), then an R-P flag is set. If the Equation (2) test then gets an admissible score for the letter P (i.e., the n−1-stroke member of the pair), the flag indicates that the R-P entry in the interference table should be checked. That entry says to reject the letter P if the graphical element omitted from the input symbol was its last stroke, and otherwise to admit it.

The angle-differences appearing in Eqs. (1) and (2) should be adjusted into the range $(-\pi,\pi)$. This is achieved by adding to $\phi[j]$ (positive or negative) multiples of $2\pi$ for odd values of the index j (i.e., at the first endpoint of each stroke). Then the same adjustment is made to $\phi[j+1]$ in order to preserve the angle difference between the endpoints of each stroke.

For a given input symbol, the above-described tests generally yield a short list of surviving candidate alphabet symbols, typically 1–6 such symbols. For the next stage of matching, it is convenient to employ a test 180 that compares the locations of the stroke endpoints of the input symbol with those of the surviving alphabet symbols. According to an exemplary such test, an endpoint score $S_{xy}[i]$ is defined by:

$$S_{xy}[i] = \frac{1}{m_A[i]} \sum_{j=1}^{m_A[i]} ((x'[j] - x_A[i, j])^2 + (y'[j] - y_A[i, j])^2), \quad (3)$$

and the input symbol is translated to the position that minimizes this endpoint score.

Here, $x'[j]$ and $y'[j]$ are the Cartesian coordinates of the respective endpoints of the optimally translated input symbol, and $x_A[i,j]$ and $Y_A[i,j]$ are the Cartesian coordinates of the endpoints of the i-th alphabet symbol.

The minimizing translation is the one that superposes the centroids of the two symbols' endpoint sets.

If points were omitted from the input symbol in the angle-screening steps, then the same points are omitted in the endpoint-matching step.

Figure 8:
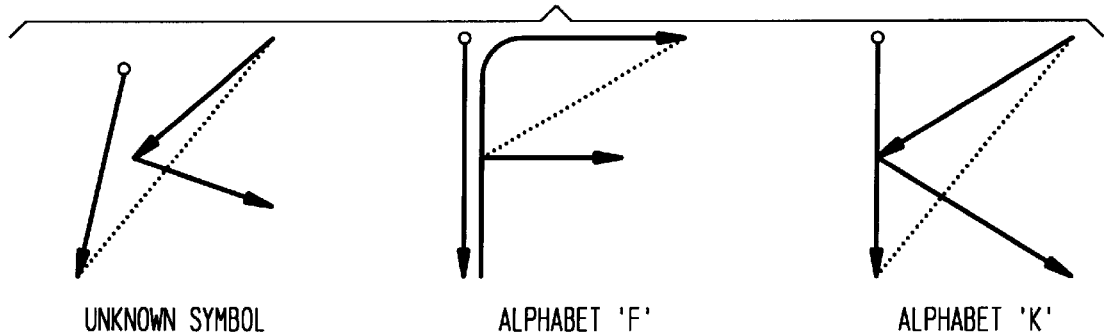
FIG. 8 compares an illustrative input symbol with two illustrative candidate alphabet symbols to which the input symbol might be matched.
Figure 9:
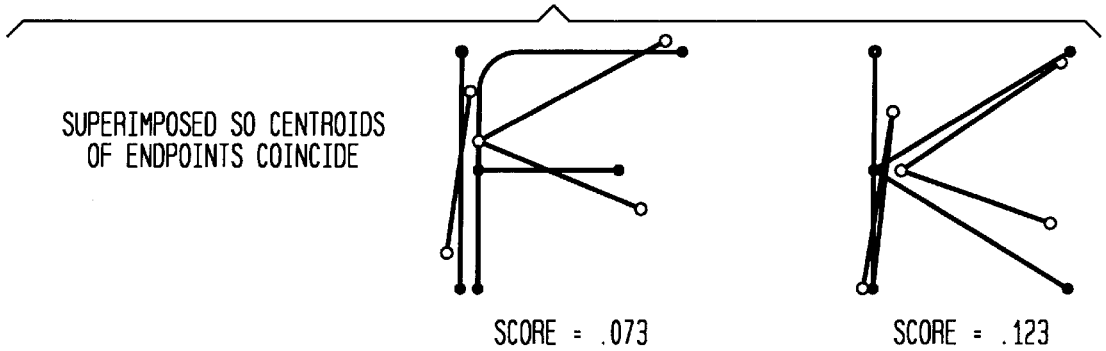
FIG. 9 depicts a superposition of the input symbol onto the respective alphabet symbols of FIG. 8.

Although we have found that Equation (3) usually assigns the lowest score to the correct alphabet symbol, we have also found that it is subject to certain inaccuracies. For example, FIG. 8 shows an input symbol and the candidate alphabet symbols F and K. FIG. 9 shows the optimal superposition of the input symbol on each alphabet symbol. As shown in the figure, the lower score is awarded to the alphabet symbol F, even though it is obvious upon inspection that the correct match is the symbol K.

Accuracy is improved if the translation of the unknown symbol described above is followed by a more general linear transformation, which allows expansion or contraction along any pair of orthogonal axes as well as arbitrary rotation. The algorithm chooses in each case that linear transformation that gives the best fit. Although this procedure improves the fit to incorrect alphabet symbols as well as to the correct one, my experience has shown that the improvement is almost always much greater when the symbol is correct. Thus, the relative score is improved.

Figure 10:
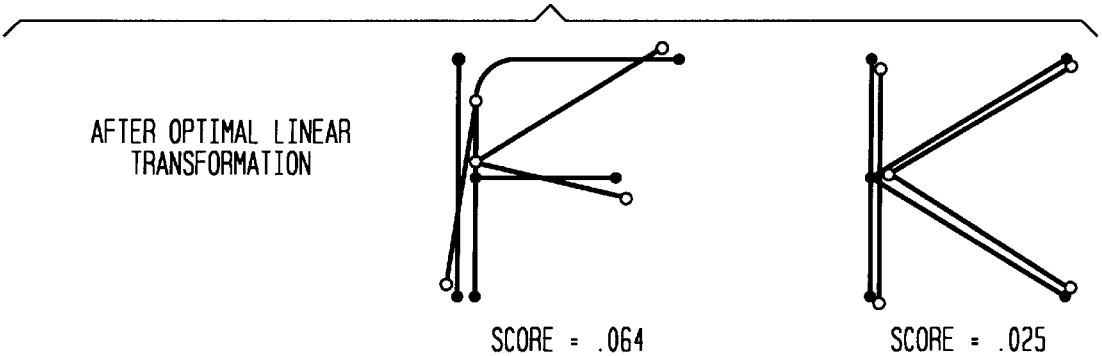
FIG. 10 depicts the superpositions of FIG. 9 after respective linear transformations of the input symbol.

For example, FIG. 10 shows that after an optimal linear transformation of the input symbol, the (correct) fit to the alphabet symbol K receives a lower score than the fit to the alphabet symbol F.

The linear transformation is conveniently applied in a translated coordinate system that takes as its origin the common centroid of all of the endpoints of the input symbol. In the following discussion, endpoint coordinates referred to this origin are denoted by the subscript c. Transformed coordinates are denoted $x''_c$ and $y''_c$, respectively.

The general linear transformation is:

$$x''_c[j] = p_{xx} x_c[j] + p_{xy} y_c[j],\qquad(4)$$

$$y''_c[j] = p_{yx} x_c[j] + p_{yy} y_c[j].$$

The optimal values of the coefficients $p_{xx}$, $p_{xy}$, $p_{yx}$, $p_{yy}$ are obtained by minimizing the score $S_{xy}[i]$ (for the i-th alphabet symbol). A convenient formula for this score is:

$$S_{xy}[i] = \frac{1}{m_A[i]} \sum_{j=1}^{m_A[I]} ((x''_c[j] - x_{cA}[i,j])^2 + (y''_c[j] - y_{cA}[i,j])^2).\qquad(5)$$

I have further found that without certain constraints, the general linear transformation is prone to errors. For example, it could rotate an input letter N through 90 degrees, and thus match it to the alphabet symbol Z. Therefore, it is preferable to employ a constrained linear transformation having the coefficients $p'_{xx}$, $p'_{xy}$, $p'_{yx}$, $p'_{yy}$ described below.

Figure 11:
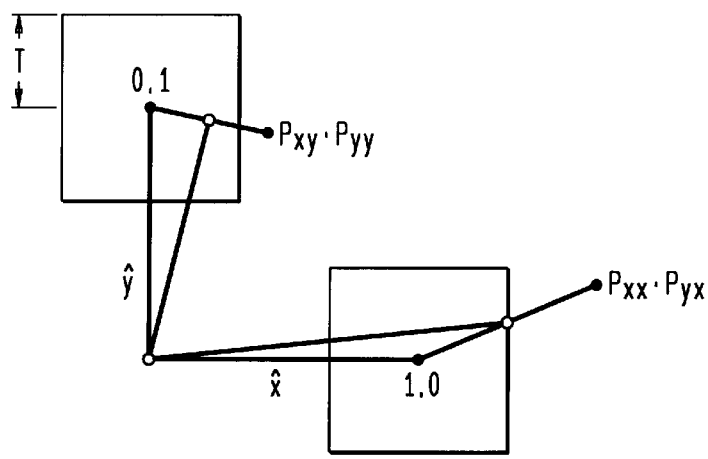
FIG. 11 is a geometrical diagram illustrating a constraint that is advantageously imposed on linear transformations that may be applied to input symbols in accordance with some embodiments of the invention.

Turning to FIG. 11, shown there are unit vectors $\hat{x}$ and $\hat{y}$, together with their transformed endpoints ($p_{xx}$, $p_{yx}$) and ($p_{xy}$, $p_{yy}$), respectively, according to the general (unconstrained) linear transformation. Also shown in the figure is a constraint, represented by a pair of boxes drawn around the respective (unconstrained) endpoints. Each box is a square of side 2T, such that the distance from the enclosed unit-vector endpoint to any side of the enclosing box is T.

A useful constraint is to confine the unit-vector endpoints to these boxes. More specifically, the action of any given linear transformation on the initial unit vectors can be pictured as the result of a continuous morphing of the unit-vector endpoints from their initial to their final positions (as determined by the given transformation).

The constraint described here stops the morphing as soon as either of the respective unit-vector endpoints reaches the boundary of its confining box. The positions of the respective endpoints at that moment determine the constrained linear transformation.

A mathematical formula relating the coefficients $p'_{xx}$, $p'_{xy}$, $p'_{yx}$, $p'_{yy}$ of the constrained linear transformation to the coefficients $p_{xx}$, $p_{xy}$, $p_{yx}$, $p_{yy}$ of the general transformation is conveniently expressed in terms of a parameter $\lambda$ defined by:

$$\lambda = \min\left[1, \frac{T}{|p_{xx}-1|}, \frac{T}{|p_{yx}|}, \frac{T}{|p_{xy}|}, \frac{T}{|p_{yy}-1|}\right].$$

The constrained linear transformation has the coefficients:

$p'_{xx} = 1 + \lambda(p_{xx}-1)$
$p'_{xy} = \lambda p_{xy}$
$p'_{yx} = \lambda p_{yx}$
$p'_{yy} = 1 + \lambda(p_{yy}-1)$.

It should be noted that the centroids of the input and alphabet symbols coincide at every point of the morphing, and in particular where the morphing is stopped by the box constraint. Thus, the input symbol is always optimally located with respect to the alphabet symbol.

The box size T is a control parameter whose best value should be determined empirically. By way of example, I have found that about 0.35 is a useful value for T. This value is generally found to impose only moderate constraint on good matches, but prevents many of the incorrect matches that would otherwise have a low (error) score.

Referring back to the scoring formula, Eq. (5), it should be noted that for purposes of evaluating the score, each of the intermediate endpoints (i.e., stroke endpoints other than the first endpoint and last endpoint of a given symbol) is effectively double because the end of one stroke is always close to the beginning of the next stroke. (This is even true for pen lifts, since, as noted, the pen-lift trajectory is treated as an artificial stroke.) To give the initial and final endpoints as much weight as the intermediate endpoints, it is desirable to double the first and last terms in the summation of Eq. (5).

I have found it useful to impose a further constraint on the linear transformation when the stroke number is low; i.e., when the input symbol has fewer than four strokes. Such a constraint, which is described below, is useful because the matching power of even the constrained linear transformation tends to be too great when matching symbols having few strokes.

As noted, the input symbol is scaled to a standard height before it is segmented into strokes. Desirably, this scaling step also establishes an origin that corresponds approximately to the origin of the alphabet symbols. I have found that when the stroke number is low, absolute positions relative to this origin are more informative than the fitting score $S_{xy}[i]$. Thus, no linear transformation is performed on single-stroke input characters. If the stroke number is two or three, the (constrained) horizontal components $p'_{xx}$ and $p'_{xy}$ of the transformation are used, but $p'_{yx}$ is set to zero, and $p'_{yy}$ is set to 1. This permits the straightening of slanted letters and the adjustment of widths, but does not permit rotations and vertical distortions.

Referring back to FIG. 10, it is evident that even after the optimal linear transformation, the angles of the input symbol are still badly mismatched to the angles of the alphabet symbol F, whereas they are well matched to the (correct) alphabet symbol K. Turning again to FIG. 7, I have found it advantageous to use this information by calculating the angles of the transformed input symbol, and using these values in recalculation 210 of the angle score $S_\phi[i]$.

More specifically, the angle recalculation proceeds as follows. The linear transformation of Eq. (4) maps a tangent line at angle $\phi$ into a tangent line at angle $\phi' = \phi + \Delta\phi$. Let $x_0 = \cos\phi$, and let $y_0 = \sin\phi$. Let $x_1 = p_{xx} x_0 + p_{xy} y_0$, and let $y_1 = p_{yx} x_0 + p_{yy} y_0$. Then provided the linear transformation is constrained by the box constraint described above, and provided the control parameter T is less than 0.5, the angle change $\Delta\phi$ due to the linear transformation is given by:

$$\Delta\phi = \arcsin\left[\frac{x_0 y_1 - x_1 y_0}{(x_1^2 + y_1^2)^{1/2}}\right].$$

To recapitulate, I have discussed, up to this point, two scores that (in operation 220) are advantageously combined into a total score $S_{TOT}$ for evaluating the fit between an input symbol and a candidate alphabet symbol. These are the endpoint-matching score $S_{xy}[i]$ and the recalculated angle score $S_\phi[i]$.

Advantageously, a further score, which I refer to as the pen-up mismatch score, is also combined into the total score $S_{TOT}$. This further score (evaluated in operation 230) is based on the observation that in a correct match, each pen-down stroke of the alphabet symbol will generally correspond to a pen-down stroke of the input symbol. Therefore, violations of this rule contribute a relatively high value to the pen-up mismatch score, and through it, to the total score $S_{TOT}$. However, it is desirable to define the pen-up mismatch score to have enough flexibility to deal with those cases in which there is no reliable rule concerning pen-up mismatches. For example, if the stroke in question retraces another stroke, then it may or may not be drawn with the pen in the up position.

A pen-up mismatch score that is currently preferred is based on two pen-up indicators. The indicators $f_u$ for the (unknown) input symbol takes one of two values: 0 if the stroke is pen-up, and 1 if it is pen-down. The indicator $f_a$ for the alphabet symbol takes one of three values: −1 if the stroke is pen-up; 0 if the stroke is "optional"; and 1 if the stroke is pen-down. (A stroke is said to be "optional" if it retraces another stroke.)

The product $(f_u - 0.5)f_a$ is calculated. The penup mismatch score $S_{pen}$ (which may, for example, be taken as simply proportional to this product) takes on a positive value (so as to increase the total error score) only when this product is negative.

As shown in FIG. 7, the final score $S_{TOT}$, used for the selection 240, is a linear combination of the scores $S_{xy}$, $S_\phi$, and $S_{pen}$.

It should be noted, however, that in certain cases it may be advantageous to override the symbol selection based on $S_{TOT}$, using information based on practical experience with the alphabet of concern and its variants over the human population of concern.

Thus, for example, I have explained above that the segmentation of input symbols into strokes is mainly performed by a thresholded filter function that has output peaks at corners and cusps of the input symbol. Certain segmentation errors are inherent because of the variability in human handwriting. Illustratively, a letter P having a pointed bow may exhibit a greater peak curvature than a letter L having a rounded corner. In such a case, no threshold could be set, that would correctly segment both the P and the L.

This problem may be mitigated when the human handwriting which is to serve as input is first segmented and reduced to stroke-parameter data. At this stage, it is advantageous to operate the filter function at three different threshold levels. Each threshold produces a segmented input symbol for which the recognizer selects a best fitting alphabet symbol. If the three selected symbols are not all the same, then the algorithm generally chooses the one with the lowest score. (See 250A and 250B in FIG. 7.)

Relatively rare exceptions to this rule occur when the three selected symbols show certain distinctive patterns. For example, the low threshold may yield 'B' and the high threshold 'D' (with the middle threshold yielding either one). This occurs if 'B' is written with a shallow and rounded dent instead of a cusp. The low, sensitive threshold puts a break at the dent but the high, insensitive threshold does not. In this case the program chooses 'B' regardless of score. A list of such distinctive patterns is included in lookup table 260.

Another list in lookup table 260 is used to distinguish certain special pairs of similar symbols. One such pair is 'Z' and '2'. If either of these is the low score symbol, the program does a special test in which it compares upper right and lower left curvature peaks. (As evidence it uses tangent angle differences at the two joints.) The outcome of this test overrides the score. Another special test distinguishes 'A' from 'H' by comparing the separation of the vertical bars at top and bottom. Still another distinguishes 'N' from 'W' by noting the closeness by which the second stroke retraces the first. Further such tests will readily come to the mind of the skilled practitioner. Such tests imitate those used by humans in ambiguous cases.

EXAMPLE

A group of 51 experimental subjects were asked to write out, in duplicate, the message "the quick brown fox jumps over the lazy dog" and the digits 1–9. The subjects were instructed to emulate the alphanumeric symbols shown in FIG. 12.

The resulting records were divided into two groups. The recognition procedure and the stored alphabet were tuned to reduce systematic errors in the first of these groups. The error rate finally achieved for this group was 2.5%. The procedure had an error rate of 3.4% when applied to the second group without further tuning.

It will be understood that many modifications and extensions may be made to the symbol-recognition procedure described above to achieve, e.g., reductions in the error rate. Many such modifications and extensions may, in fact, be made without departing from the spirit of the invention as set forth in the claims appended hereto.

I claim:

1. A method for classifying at least one handwritten symbol, comprising:
   a) providing, in a data storage medium, a representation of the symbol as a sequence of one or more discrete strokes having respective initial and final endpoints directed tangents associated with initial and final end points, said representation comprising a spatial location and a tangent angle associated with each said endpoint, wherein the tangent angle is defined relative to the directed tangents of the end points and relative to an axis of a system containing the representation;
   b) retrieving, from a data storage medium, representations of plural library symbols, each said library symbol comprising a prototype of one of a plurality of possible classes to which the input symbol may be assigned; and
   c) in a digital data processor, comparing the input symbol representation to each library symbol representation; wherein the comparing step comprises:
   d) comparing the respective tangent angles of the input symbol with the corresponding tangent angles of at least some of the library symbols; and
   e) comparing the respective endpoint locations of the input symbol with the corresponding endpoint locations of at least some of the library symbols to develop a score that allows matching the input symbol representation with the library symbol representation.

2. The method of claim 1, wherein the comparing step comprises calculating an angle score that expresses a mismatch between the tangent angles of the input symbol and the corresponding tangent angles of each of a first set of library symbols.

3. The method of claim 2, wherein the comparing step further comprises calculating an endpoint score that expresses a mismatch between the endpoint locations of the input symbol and the corresponding endpoint locations of each of a second set of library symbols.

4. The method of claim 3, wherein the second set is a subset of the first set.

5. The method of claim 3, wherein the comparing step further comprises incorporating the angle score and the endpoint score into a respective total mismatch score for each of at least some library symbols.

6. The method of claim 5, further comprising assigning the input symbol to the class of the library symbol having the smallest total mismatch score.

7. The method of claim 5, wherein:
the calculation of the angle score precedes the calculation of the endpoint score;
the second set is derived from the first set by omitting those library symbols, if any, for which the respective angle score exceeds a threshold;
a third set is derived from the second set by omitting those library symbols, if any, for which the respective endpoint score exceeds a threshold; and
a total mismatch score is calculated for at least some library symbols belonging to the third set.

8. The method of claim 1, wherein:
the input symbol representation further comprises, for each stroke of the input symbol, an indicator $f_u$ that distinguishes between pen-up strokes and pen-down strokes;
each library symbol representation comprises, for each stroke of the input symbol, an indicator $f_a$ that distinguishes between pen-up strokes and pen-down strokes; and
the comparing step further comprises comparing each indicator $f_u$ of the input symbol with the corresponding indicator $f_a$ of each of at least some of the library symbols.

9. The method of claim 5, wherein:
the input symbol representation further comprises, for each stroke of the input symbol, a pen indicator $f_u$ that distinguishes between pen-up strokes and pen-down strokes;
each library symbol representation comprises, for each stroke of the input symbol, a pen indicator $f_a$ that distinguishes between pen-up strokes and pen-down strokes; and the comparing step further comprises:
comparing each pen indicator $f_u$ of the input symbol with the corresponding pen indicator $f_a$ of each of at least some of the library symbols, thereby to compute respective pen scores, each said pen score expressing a mismatch between the pen indicators of the input symbol and the corresponding pen indicators of one of the library symbols; and
incorporating the pen score into the total mismatch score for each of at least some library symbols.

10. The method of claim 9, wherein the input-symbol pen indicator $f_u$ is binary valued, the library-symbol pen indicator $f_a$ is ternary valued, and one possible value of $f_a$ indicates that it is immaterial whether the pen is up or down.

11. The method of claim 10, wherein: possible values of $f_u$ are 0 for pen-up and 1 for pen-down; possible values for $f_a$ are −1 for pen-up, 0 if the pen status is immaterial, and +1 for pen-down, and the pen score is derived from the product $(f_u-0.5)f_a$.

12. The method of claim 1, wherein the step of comparing tangent angles comprises comparing the input symbol with those library symbols having the same number of strokes as the input symbol, and comparing the input symbol with those library symbols having one fewer stroke than the input symbol.

13. The method of claim 12, wherein the step of comparing the input symbol with those library symbols having one fewer stroke than the input symbol is carried out by omitting, from the input symbol, that stroke whose omission best improves the match between the input symbol and the current library symbol.

14. The method of claim 3, wherein the step of comparing endpoint locations comprises translating the input symbol to a position that minimizes the endpoint score.

15. The method of claim 14, wherein the step of comparing endpoint locations further comprises, after the translating step, the step of transforming the input symbol according to a linear transformation that minimizes the endpoint score.

16. The method of claim 15, wherein a constraint is imposed on the linear transformation such that excessive symbol rotations are avoided, and the endpoint score is minimized subject to said constraint.

17. The method of claim 16, wherein the constraint is that the transformed images of the unit vectors (1,0) and (0,1) must have endpoints that remain within squares centered at the respective points (1,0) and (0,1), said squares have sides of length 2T parallel to the respective x and y coordinate axes, and 2T is less than 1.

18. The method of claim 17, further comprising, after the linear transformation step, the step of calculating a revised angle score that expresses a mismatch between the tangent angles of the transformed input symbol and the corresponding tangent angles of each of at least some library symbols.

19. The method of claim 18, wherein the comparing step further comprises incorporating the revised angle score and the endpoint score into a respective total mismatch score for each of at least some library symbols.

20. A method for classifying at least one handwritten symbol, comprising:
a) providing, in a data storage medium, a representation of the symbol as a sequence of one or more discrete strokes having respective initial and final endpoints directed tangents associated with initial and final end points, said representation comprising a spatial location and a tangent angle associated with each said endpoint, wherein the tangent angle is defined relative to the directed tangents of the end points and relative to an axis of a system containing the representation;
b) retrieving, from a data storage medium, representations of plural library symbols, each said library symbol comprising a prototype of one of a plurality of possible classes to which the input symbol may be assigned; and
c) in a digital data processor, comparing the input symbol representation to each library symbol representation, said comparing step carried out so as to result in a reduced set of library symbols to whose respective classes the input symbol may be assigned, each library symbol in said reduced set having an associated total mismatch score; and
d) assigning the input symbol to the class of that library symbol having the smallest total mismatch score; wherein the comparing step comprises:
e) calculating an angle score that expresses a mismatch between the tangent angles of the input symbol and the corresponding tangent angles of each of the library symbols, and removing from further consideration those library symbols having angle scores that exceed a threshold;

f) then calculating an endpoint score that expresses a mismatch between the endpoint locations of the input symbol and the corresponding endpoint locations of each of the library symbols, and removing from further consideration those library symbols having endpoint scores that exceed a threshold, wherein said endpoint calculation comprises translating and linearly transforming the input symbol to minimize each respective endpoint score;

g) then calculating a revised angle score that expresses a mismatch between: (i) the tangent angles of the input symbol after said minimizing translation and linear transformation, and (ii) the corresponding tangent angles of each of the library symbols that remains under consideration; and h) incorporating the endpoint score and the revised angle score into the total mismatch score.

21. The method of claim 20, wherein:

the input symbol representation further comprises, for each stroke of the input symbol, an indicator $f_u$ that distinguishes between pen-up strokes and pen-down strokes; and each library symbol representation comprises, for each stroke of the input symbol, an indicator $f_a$ that distinguishes between pen-up strokes and pen-down strokes; the method further comprising:

comparing each indicator $f_u$ of the input symbol with the corresponding indicator $f_a$ of each of at least some of the library symbols, thereby to compute respective pen scores, each said pen score expressing a mismatch between the pen indicators of the input symbol and the corresponding pen indicators of one of the library symbols; and incorporating the pen score into the total mismatch score for each of at least some library symbols.

22. The method of claim 21, wherein the providing step comprises receiving at least one digitized, handwritten input symbol, and performing a segmentation operation on said symbol, thereby to segment said symbol into discrete strokes.

23. The method of claim 22, wherein the segmentation operation comprises applying to the digitized symbol a thresholded filter function that has output peaks at corners and cusps of the input symbol.

24. The method of claim 23, wherein the thresholded filter function is applied at three different threshold levels, resulting in three respective versions of the segmented input symbol.

25. The method of claim 24, wherein the comparing step is carried out on each respective version of the segmented input symbol.

26. The method of claim 25, wherein the comparing step comprises:

calculating an angle score that expresses a mismatch between the tangent angles of each version of the input symbol and the corresponding tangent angles of each of at least some library symbols, and excluding from further consideration, in regard to a given said version, those library symbols having an angle score that exceeds a threshold;

calculating an endpoint score that expresses a mismatch between the endpoint locations of each version of the input symbol and the corresponding endpoint locations of each of at least some library symbols, and excluding from further consideration, in regard to a given said version, those library symbols having an endpoint score that exceeds a threshold; and for each version of the input symbol, incorporating the angle score and the endpoint score into a total mismatch score for each of at least some library symbols that remain under consideration; the method further comprising:

assigning the input symbol to the class of a library symbol based, at least in part, on the values of the respective total mismatch scores.

* * * * *